(12) United States Patent
Habeck

(10) Patent No.: US 8,549,238 B2
(45) Date of Patent: Oct. 1, 2013

(54) MAINTAINING A TIMESTAMP-INDEXED RECORD OF MEMORY ACCESS OPERATIONS

(75) Inventor: William H. B. Habeck, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 13/249,009

(22) Filed: Sep. 29, 2011

(65) Prior Publication Data

US 2013/0086337 A1    Apr. 4, 2013

(51) Int. Cl.
*G06F 12/00*    (2006.01)

(52) U.S. Cl.
USPC ........... 711/156; 711/165; 711/170; 711/171; 707/809; 707/812

(58) Field of Classification Search
USPC ................. 711/156, 165, 170, 171; 707/809, 707/812
See application file for complete search history.

(56) References Cited

U.S. PATENT DOCUMENTS

| 6,952,664 | B1 | 10/2005 | Lahiri |
| 7,287,133 | B2* | 10/2007 | Rowan et al. ................. 711/156 |
| 7,296,008 | B2* | 11/2007 | Passerini et al. ...................... 1/1 |
| 7,558,786 | B2* | 7/2009 | Robson et al. ........................ 1/1 |
| 7,577,806 | B2* | 8/2009 | Rowan et al. ................. 711/162 |
| 7,577,807 | B2* | 8/2009 | Rowan et al. ................. 711/162 |
| 7,584,337 | B2* | 9/2009 | Rowan et al. ................. 711/162 |
| 7,783,852 | B2 | 8/2010 | Lahiri |
| 2006/0047895 | A1* | 3/2006 | Rowan et al. ................. 711/112 |
| 2011/0302195 | A1* | 12/2011 | Cai et al. ...................... 707/769 |

* cited by examiner

*Primary Examiner* — Stephen Elmore
(74) *Attorney, Agent, or Firm* — Shun Yao; Park, Vaughan, Fleming & Dowler LLP

(57) ABSTRACT

A memory management system determines a timestamp for a memory access operation that accesses a block of data, and uses the timestamp to access a timestamp-indexed record. The timestamp-indexed record includes a plurality of record arrays, each of which corresponds to a different time range, and includes one or more record entries of a different array-specific time duration. The system selects a record entry that indicates a time range associated with the timestamp, and that indicates an amount of memory accessed during the indicated time range. The system then updates the selected record entry to account for the memory size of the block of data.

24 Claims, 6 Drawing Sheets

MAINTAINING A TIMESTAMP-INDEXED RECORD OF MEMORY ACCESS OPERATIONS

BACKGROUND

1. Field of the Invention

The present disclosure relates to memory management. More specifically, the present disclosure relates to a method and system for maintaining a timestamp-indexed record of memory access operations for a memory pool.

2. Related Art

Computer memory is often managed by allocating multiple memory pools that satisfy different classes of memory allocation requests. A memory pool can be a portion or range of memory (e.g., blocks), and the size of each of the memory pools is typically controlled by and managed through use of separate memory parameters. Some memory management systems may specify static default values for the sizes of each memory pool based on certain heuristics. Other memory management systems require a system administrator to indicate an explicit size for the memory pools.

In practice, the system administrator may manually optimize the size for these memory pools, which can involve an iterative process of trial and error. Unfortunately, the optimal allocation of memory among the memory pools can change over time, as it depends on the type of workload that is occurring on a given application that is using the memory. For example, a database server may employ several memory pools, such as a first pool used for performing backup jobs, and a second pool used for on-line transaction processing (OLTP) activities. If a system is configured to optimize the first pool to accommodate a nightly recovery management backup job, then most of this memory can remain unused for the majority of the day. On the other hand, if the first pool is too small because the system is configured to optimize the second pool, then it is likely that the memory backup jobs may not be performed or completed.

The system administrator may also configure memory allocation parameters for one or more applications, and the memory management system may optimize the size of the memory pools based on these allocation parameters. However, administrators typically may not revisit these allocation parameters, which can cause some pools to become underutilized. This can cause an application to fail when it cannot allocate sufficient memory to memory pools, and can cause performance problems when the system needs to excessively reload data from disk. Thus, some administrators purposely oversize some memory pools to handle the worst-case scenarios to avoid system errors, and to avoid the need to reallocate a memory pool. Unfortunately, oversizing some memory pools to avoid system errors can lead to a significant performance loss for other memory pools.

SUMMARY

One embodiment of the present invention provides a system that maintains a timestamp-indexed record of memory access operations for a memory pool. Specifically, the system determines a timestamp for a memory access operation that accesses a block of data, and uses the timestamp to access a timestamp-indexed record. The timestamp-indexed record includes a plurality of record arrays, each of which corresponds to a different time range. The record entries of a record array can correspond to an array-specific time duration that is unique to that array. The system selects a record entry that indicates a time range associated with the timestamp, and indicates an amount of memory accessed during the indicated time range. The system then updates the selected record entry to account for the memory size of the block of data.

In some embodiments, the system selects the record entry by determining that a first record array does not include a record entry for the timestamp, and allocating a record entry for the timestamp in the first record array.

In some variations to these embodiments, if the first record array does not have an available record entry, the system allocates the record entry by migrating a subset of record entries of the first record array to a target record entry of a second record array, and releases the subset of record entries of the first record array.

In some variations to these embodiments, the system migrates the subset of record entries of the first record array to the target record entry by first allocating, in the second record array, a record entry that has a time range covering the time range of the subset of record entries. The system then updates the allocated record entry to indicate an amount of data accessed during the time range associated with the subset of record entries.

In some variations to these embodiments, when the second record array includes one record entry associated with an earliest time range of the timestamp-indexed record, the system migrates the subset of the record entries of the first record array to the target record entry by first updating the target record entry's time range to cover a time range of the subset of record entries. The system then updates the target record entry to account for an amount of data accessed during the time range of the subset of record entries.

In some embodiments, the system generates a time-saved array for a memory pool of a managed memory based on the timestamp-indexed record. The time-saved array indicates an amount of time saved during memory access operations for each of a plurality of alternative memory pool sizes.

In some embodiments, the system selects a memory pool of the managed memory that benefits most from an increase in available memory based on its corresponding time-saved array. The system then determines an amount by which to increase the selected memory pool's available memory based on its corresponding time-saved array.

In some embodiments, a record entry of the timestamp-indexed record also indicates at least one or more of an amount of memory used by data objects accessed during the record entry's time range, and/or an amount of memory accessed after the record entry's time range.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention solve the problem of adaptively allocating memory among multiple memory pools of a managed memory by providing a system that maintains a timestamp-indexed record of memory access operations to determine a memory pool that can benefit the most from an increase in memory allocation.

For example, the system can use a volatile memory (managed memory) to allocate these memory pools for an application, such that each of these memory pools can be used to satisfy a certain class of memory request. The application can implement a plurality of jobs using various processes that access memory, such that the memory demands for each job can change over time. A web application, for example, can include a first job that performs periodic data backup operations, and can include a second job that performs on-line transaction processing (OLTP) activities whose memory demand varies based on the number of simultaneous on-line users. Thus, the system can associate each job with a certain memory pool, and can adjust the memory allocation for these memory pools to account for changes in memory demand.

In some embodiments, the system can use the timestamp-indexed record for each memory pool to store profiling information for memory access operations. This profiling information can indicate an amount of memory that was accessed during a given time range, and an amount of memory that has been accessed after the given time range. Also, the system can use this memory-access profiling information to maintain a time-saved array that indicates an amount of time that can be saved (or spent) by increasing (or decreasing) the amount of memory allocated for a given memory pool.

Figure 1:
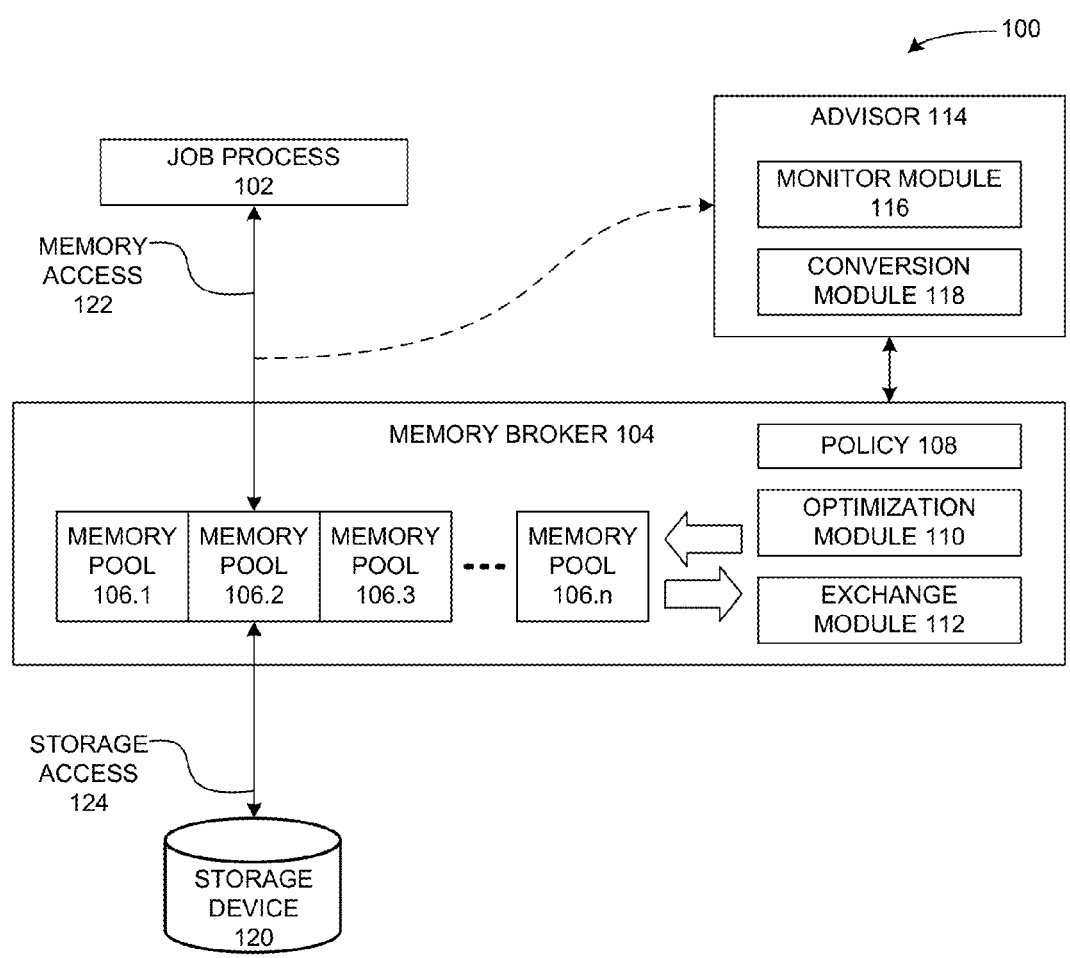
FIG. 1 illustrates an exemplary memory exchange system in accordance with an embodiment of the present invention.

FIG. 1 illustrates an exemplary memory exchange system 100 in accordance with an embodiment of the present invention. Memory exchange system 100 can include a memory broker 104, an advisor 114, and a storage device 120. During operation, memory broker 104 can use a policy 108 to allocate a plurality of memory pools 106.1-106.n for an application. For example, the application can perform several jobs, and each job can create processes (e.g., job process 102) that access a different class of memory. Thus, to optimize usage of a shared memory, memory broker 104 can allocate memory pools 106.1-106.n so that each job has a corresponding memory pool.

Memory broker 104 can manage a memory pool as particular amounts or units of memory, referred to herein as memory "granules." A granule of memory refers to a unit of memory allocation in the managed memory. In some embodiments, memory broker 104 can add or release granules for a memory pool in response to auto-tuning actions and user-initiated resize operations for the memory pool.

In some embodiments, memory broker 104 can auto-tune the memory size for individual memory pools within the shared memory. For example, a memory pool can be a cache and its size can be tunable. However, other memory pools can be a source of free memory that can be used to allocate memory, and may not be tunable. Memory broker 104 can optimize an untunable memory pool by initializing the untunable pool so that it is large enough to accommodate all simultaneous memory allocations for that memory pool.

In some embodiments, memory broker 104 can process memory access operation 122 for job process 102 by performing a lookup in a corresponding memory pool (e.g., memory pool 106.2) that has been assigned to the job. If the lookup is successful, memory broker 104 can return the requested data to job process 102 from the memory pool.

However, if the lookup is not successful due to a miss, memory broker 104 can access the data from a secondary storage medium, such as storage device 120, and can insert the requested data into memory pool 106.2. Unfortunately, memory pool 106.2 has a limited amount of memory allocation, and so memory broker 104 may need to override older data to insert the requested data into memory pool 106.2. For example, job process 102 may correspond to a periodic job such as a memory backup operation, and so the cost of a miss on memory pool 106.2 may increase when job process 102 is actively accessing memory during a backup operation.

Memory exchange system 100 can mitigate the cost of a miss by increasing the amount of memory allocated to a memory pool when it detects an increase in memory access operations corresponding to that memory pool. In some embodiments, advisor 114 can predict memory access performance corresponding to many alternative memory pool sizes. Advisor 114 can maintain a timestamp-indexed record for each of memory pools 106.1-106.n, such that each record can include profiling data that indicates an amount of memory that is accessed during a given time range for a given job, and indicates an amount of memory that is accessed after the given time range.

Advisor 114 can include a monitor module 116 that monitors memory access operations (e.g., memory access 122), and uses a timestamp for the memory access to update a corresponding entry in the timestamp-indexed record so that it accounts for the amount of data accessed. Further, advisor 114 can include a conversion module 118 that converts the timestamp-indexed record for a certain memory pool into a time-saved array that indicates an amount of time that can be saved (or spent) by increasing (or decreasing) the amount of memory allocated for the memory pool.

Memory broker 104 can use the time-saved arrays corresponding to memory pools 106.1-106.n to determine which memory pool can benefit the most from an increase in memory, and optimize the overall performance of the shared memory. For example, a time-saved array for memory pool 106.2 may indicate that memory access times for memory pool 106.2 can be decreased by 1000 seconds on average (e.g., over a period of a day) if it is allocated an additional 64

MB of memory. Thus, based on policy 108, optimization module 110 may allocate an additional 64 MB to memory pool 106.2.

However, optimization module 110 may not be able to allocate additional memory to memory pool 106.2 if there is an insufficient amount of available memory. In some embodiments, exchange module 112 can exchange a memory allocation among multiple memory pools, for example, in response to receiving a request for memory from job process 102 (e.g., a memory requirement). Exchange module 112 creates a resize request structure for the request, and determines which memory pools are to release memory to transfer to a memory pool for the requesting process. For example, a time-saved array for memory pool 106.3 may indicate that memory access times for memory pool 106.3 may increase by 500 seconds on average (e.g., over a period of a day) if its memory allocation is decreased by 64 MB. Thus, based on policy 108 and the time-saved amount for memory pool 106.2, exchange module 112 may determine that the memory allocations across memory pools 106.1-106.*n* need to be redistributed by reallocating 64 MB of memory to memory pool 106.2 from memory pool 106.3.

Policy 108 can include information that reflects policies regarding the distribution of resources among memory pools 106.1-106.*n* relative to a given application or application instance. Policy 106 can indicate a default memory donor and/or a default memory recipient, an initial size for a tunable pool (e.g., in granules), and/or a maximum size for a tunable pool (e.g., as a percent of managed memory size). Policy 108 can also indicate a policy for each memory pool pertaining to a context in which a memory pool's size is to be increased or decreased, and by how much. In some embodiments, policy 108 can also indicate a performance metric that can be used to determine when a memory pool's size should be increased or decreased, and/or by how much. The performance metric can include one or more of a SQL parse time, a Java object load time, a disk time, an active server time, and/or the like. In some embodiments, policy 106 can indicate how often memory broker 104 needs to get advisories from advisor 114, and can indicate metrics for determining whether these advisories include sufficient and reliable information for redistributing memory allocations across memory pools 106.1-106.*n*.

Figure 2:
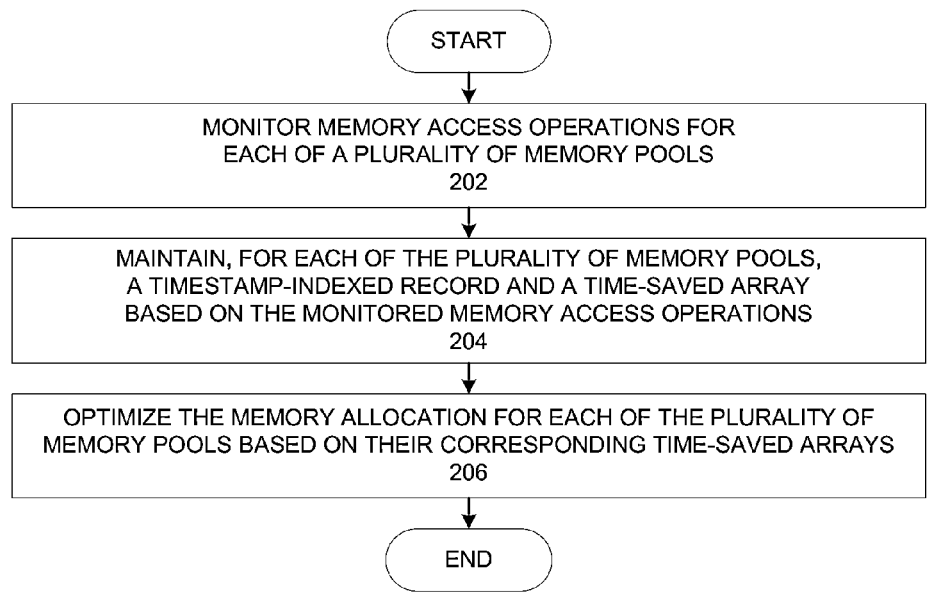
FIG. 2 presents a flow chart illustrating a process for optimizing a memory allocation for a plurality of memory pools in accordance with an embodiment of the present invention.

FIG. 2 presents a flow chart illustrating a process for optimizing a memory allocation for a plurality of memory pools in accordance with an embodiment of the present invention. During operation, the system can monitor memory access operations for each of a plurality of memory pools (operation 202). Then, the system can maintain a timestamp-indexed record and a time-saved array based on the monitored memory access operations (operation 204). For example, when the system detects a memory access operation, the system can determine a job that issued the memory access operation, and the system can determine a memory pool that has been assigned to this job.

Then, the system can use information about the memory access operation to update the timestamp-indexed record, and to update the time-saved array. In some embodiments, the system normalizes the time-saved values across time-saved arrays (e.g., corresponding to the plurality of memory pools) according to a time metric so that the system can perform a meaningful comparison and optimization on the different memory pools.

The system can then optimize the memory allocation for each of the plurality of memory pools based on their corresponding time-saved arrays (operation 206). In some embodiments, the system can periodically determine new allocation amounts for the different memory pools, and updates a memory pool's memory allocation incrementally over time rather than all at once. Also, when an application associated with a plurality of memory pools is shut down, the system can use a persistent storage to record an amount of memory that is currently allocated to each memory pool. Then, when the application is launched again, the system can read this allocation information from the persistent storage, and can allocate the memory pools based on this allocation information.

Figure 3A:
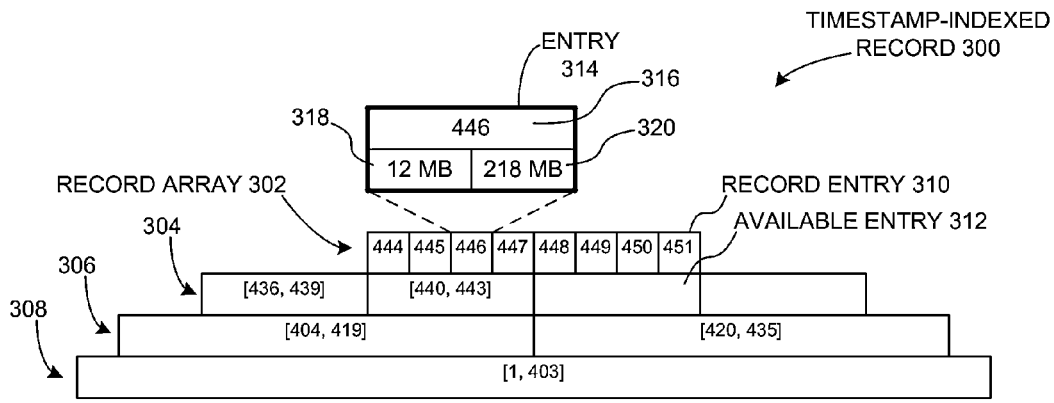
FIG. 3A presents an exemplary timestamp-indexed record in accordance with an embodiment of the present invention.

FIG. 3A presents an exemplary timestamp-indexed record 300 in accordance with an embodiment of the present invention. Timestamp-indexed record 300 includes record arrays 302, 304, 306, and 308 that together cover a contiguous time range. In some embodiments, record arrays 302, 304, 306, and 308 can be stored using a single contiguous array in memory. A record array can include one or more entries that each corresponds to a certain time range, and each entry includes profiling data that indicates an amount of memory accessed during its corresponding time range. The profiling data can also indicate an amount of memory accessed after the record entry's time range, and/or an amount of memory used by data objects accessed during the record entry's time range.

In some embodiments, two arrays are created so that the older record array (e.g., array 304) has half the number of entries as the earlier record array (e.g., array 302), and each entry covers a time range that is four-times larger than those of the earlier record array. Thus, timestamp-indexed record 300 stores a histogram of memory access amounts over a period of time, such that the time precision decreases for older record entries. For example, record array 302 includes eight one-second entries, record array 304 includes four four-second entries, and record array 306 includes two sixteen-second entries. Further, the last record array (e.g., array 308) includes one record entry that corresponds to the oldest time range. In some embodiments, the time range for array 308 corresponds to all time values that precede the time range for array 306. In other embodiments, array 308 corresponds to a restricted time range (e.g., using an explicit starting timestamp value), and does not correspond to any time value that precedes the restricted time range.

As the system detects memory access operations over time, the system can create new record entries in record array 302, and can shift data from the older record entries through arrays 304-308 in their chronological order. For example, record array 302 corresponds to the most-recent time range that begins with a timestamp value 444, such that entries for the most recent timestamp values can be allocated within array 302. The next two record arrays 304-306 may cover the following two contiguous time intervals (e.g., arrays 304 and 306 have the time intervals [436, 443] and [404, 435], respectively). Further, the last record array 308 can include a single record entry that covers the earliest time interval, and can accumulate the data values that are shifted through record arrays 302-306. Thus, as the system maintains timestamp-indexed record 300, the time intervals corresponding to record arrays 302-306 can shift to cover newer timestamp values, and the time interval corresponding to record array 308 can grow to cover the older timestamp values.

For example, timestamp-indexed record 300 can correspond to memory pool 106.2 of FIG. 1, and the system may detect a memory access operation from a job associated with memory pool 106.2 at time 446 (in seconds). This memory access operation may access a 2 MB object at time 446. Thus, the system generates a timestamp for this memory access operation, and uses this timestamp to select record entry 314 in timestamp-indexed record 300. Record entry 314 indicates a time-range 316, a current-accessed-memory total 318, and a later-accessed-memory total 320. Then, the system updates record entry 314 using information about the amount of data accessed at time 446, for example, by increasing a current-accessed-memory total 318 from 10 MB to 12 MB. In some embodiments, the system increases a later-accessed-memory total 320 for all earlier record entries (e.g., record entries within the time range [1, 445]) by 2 MB to account for the amount of data accessed during time 446.

While FIG. 3A illustrates the timestamp-indexed record 300 to include four record arrays, the number of record arrays and the number of entries per record array can vary across different computer systems. For example, in some embodiments, a timestamp-indexed record can have ten record arrays such that the first record array (e.g., corresponding to the most-recent 1024-second time range) can include 1024 single-second record entries. Thus, the second record array (e.g., corresponding to the previous 2048-second time range) can include 512 4-second record entries, and the remaining eight record arrays can be allocated similarly. Further, if these ten record arrays are stored in a single contiguous array in memory, the first record array can be allocated at index positions 0-1023 of the array in memory, the second array can be allocated at index positions 1024-1535 of the array in memory, etc.

Figure 3B:
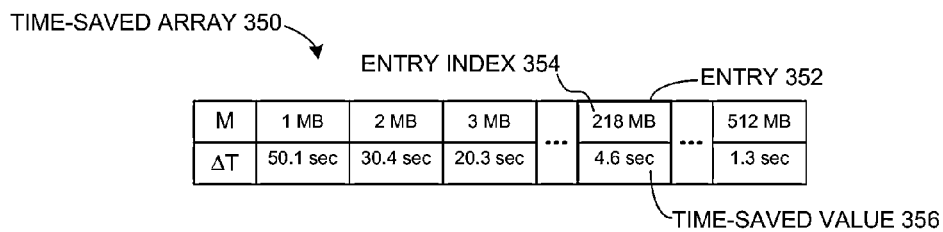
FIG. 3B presents an exemplary time-saved array in accordance with an embodiment of the present invention.

FIG. 3B presents an exemplary time-saved array 350 in accordance with an embodiment of the present invention. Time-saved array 350 can include an array that indicates, for a certain change in memory allocation for a memory pool, a corresponding amount of time that can be saved. For example, a time-saved entry 352 can include an entry index 354 that indicates a change in memory allocation, and can include a time-saved value 356 that indicates an amount of time saved for the corresponding change in memory pool allocation. Time-saved array 350 can provide time-saved values for a high-resolution of memory allocations (e.g., entry indices for array 350 can have a one-MB resolution).

In some embodiments, the system populates the time-saved array by updating an array entry corresponding to a data object that has been accessed. When the system detects a memory access operation for a data object, the system uses the timestamp for the memory access to select a record entry (e.g., from timestamp-indexed record 300 of FIG. 3A) that corresponds to the timestamp. Then, the system uses the selected record entry to determine an amount of bytes accessed more recently than the object (e.g., an amount of data accessed between the time the memory access operation was initiated for the object and the time the object's memory access operation was completed). The system then uses the determined amount of bytes to select an entry in time-saved array 350, and increases the time-saved value of the selected entry by the load time of the data object.

For example, time-saved array 350 can correspond to memory pool 106.2 of FIG. 1, and to timestamp-indexed record 300 of FIG. 3A. Thus, when the system detects the memory access operation from the job that loads the data object at time 446, the system can update time-saved array 350 based on this memory access operation. Specifically, the system can use the timestamp value 446 to select record entry 314 from timestamp-indexed record 300. The system also determines from record entry 314 that 218 MB of memory were accessed after time 446, and uses the value "218" to select a time-saved entry 352 from time-saved array 350. The system then updates time-saved entry 352 by increasing time-saved value 356 by the total load time for the data object. If the system spent 0.3 seconds loading the data object, then the system increases time-saved value 356 from 4.6 seconds to 4.9 seconds.

Maintaining a Timestamp-Indexed Record

In some embodiments, a timestamp-indexed record stores a histogram of memory access amounts that cover a range in time. When the system performs memory access operations for multiple data objects, the system can use the timestamp-indexed record to store how much data was accessed for these objects at various time-range snapshots.

Figure 4:
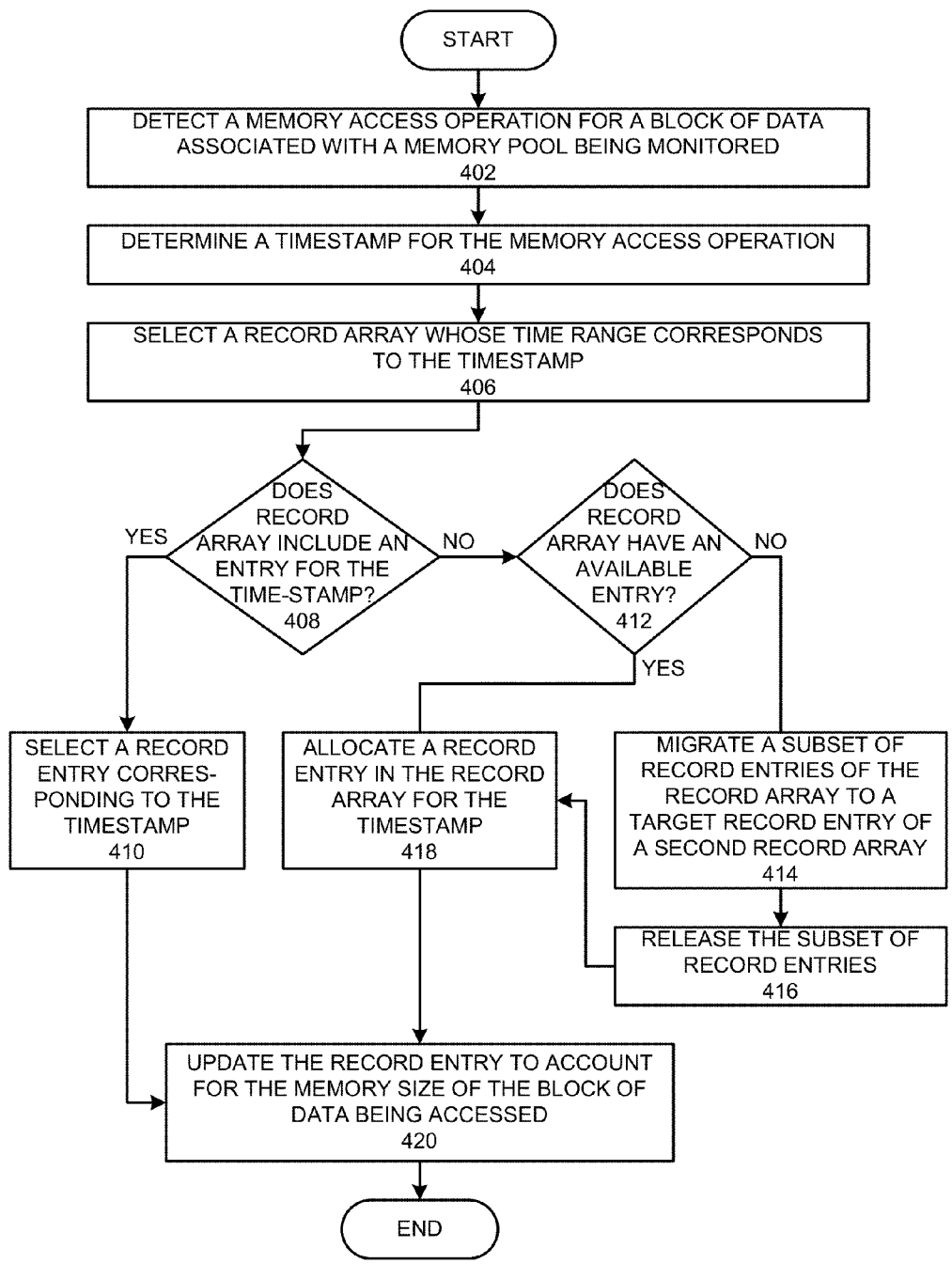
FIG. 4 presents a flow chart illustrating a process for maintaining a timestamp-indexed record corresponding to a memory pool in accordance with an embodiment of the present invention.

FIG. 4 presents a flow chart illustrating a process for maintaining a timestamp-indexed record corresponding to a memory pool in accordance with an embodiment of the present invention. During operation, the system can detect a memory access operation for a block of data associated with a memory pool being monitored (operation 402), and determines a timestamp for the memory access operation (operation 404).

The system then selects a record entry of the timestamp-indexed record that corresponds to the timestamp. In doing so, the system first selects a record array whose time range corresponds to the timestamp (operation 406). For example, the timestamp may indicate a time value 451, and the system may determine that the record array 302 (see FIG. 3) includes a record entry 310 corresponding to the timestamp. As another example, if the timestamp indicates a time value 452, the system may need to allocate a new entry in record array 302 for the new timestamp value. Thus, the system then determines whether the record array includes an entry for the timestamp (operation 408). If so, the system selects a record entry corresponding to the timestamp (operation 410), and updates the record entry to account for the memory size of the block of data being accessed (operation 420).

However, if the system determines at operation 408 that a record entry does not exist for the timestamp, the system continues to allocate a record entry corresponding to the timestamp. At operation 412, the system determines whether the record array includes an available (unused) entry (operation 412). If so, the system allocates a record entry in the record array for the timestamp (operation 418), and continues to operation 420 to update the allocated record entry.

If the system determines at operation 412 that the record array does not include an available entry, the system continues to release a subset of entries from the record array before allocating a record entry. The system can release entries by migrating a subset of record entries of the selected record array to a target record entry of a second record array (operation 414). The subset of record entries being migrated may cover a contiguous time range whose time interval matches the target record entry's time interval. For example, once record array 302 becomes filled (see FIG. 3A), its oldest record entries with timestamp values 444-447 can be migrated into an available entry 312 of record array 304. The system then releases the subset of record entries in the selected record array to make them available (operation 416), and returns to operation 418 to allocate a record entry in the record array for the timestamp.

Figure 5:
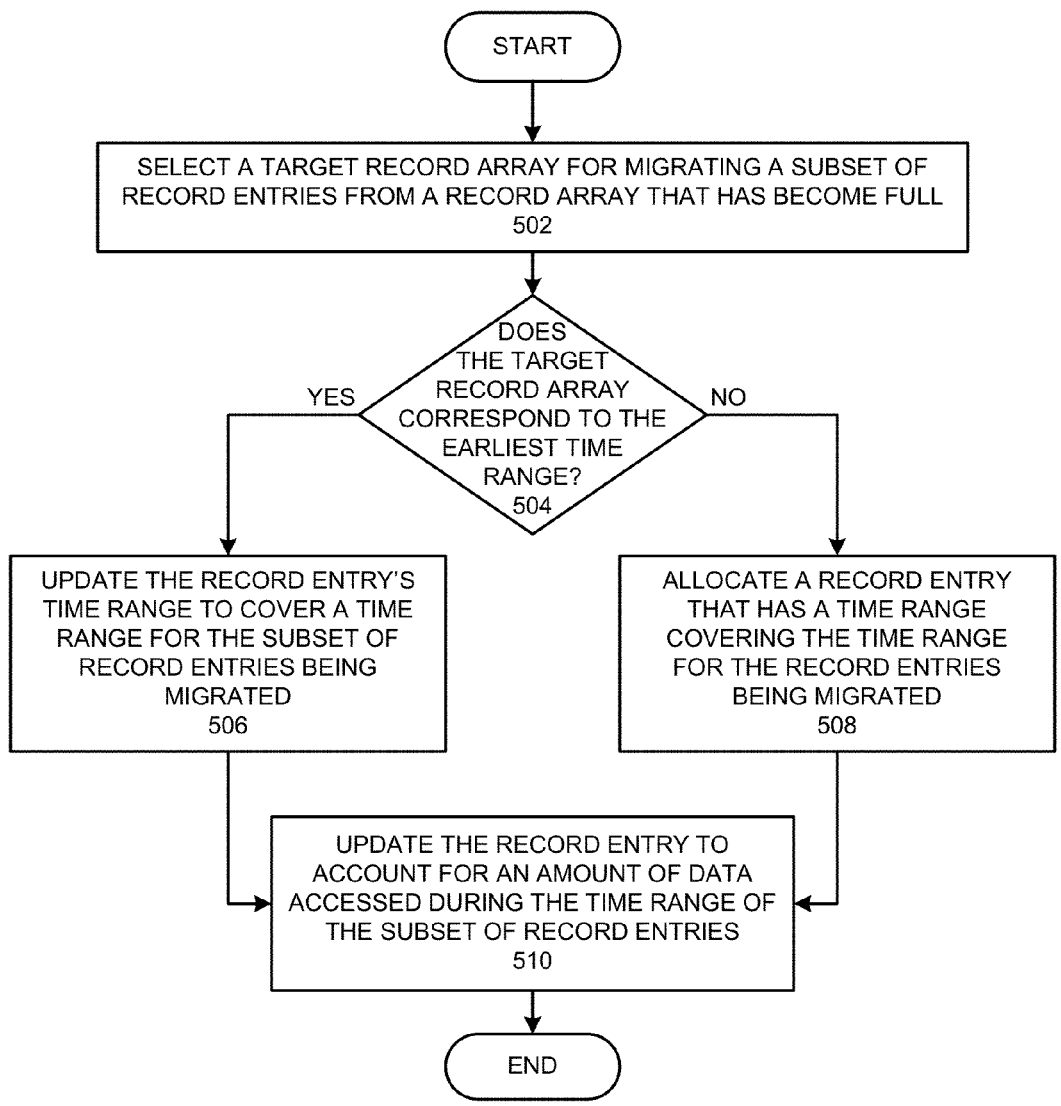
FIG. 5 presents a flow chart illustrating a process for migrating a subset of entries in a first record array into a record entry of a second record array in accordance with an embodiment of the present invention.

FIG. 5 presents a flow chart illustrating a process for migrating a subset of entries in a first record array into a record entry of a second record array in accordance with an embodiment of the present invention. During operation, the system selects a target record array for migrating a subset of record entries from a record array that has become full (operation 502). The target record array may correspond to a record array whose time range follows that of the full record array. For example, once record array 302 becomes full (see FIG. 3A), a subset of its record entries can be migrated into an available entry of record array 304.

The system then determines whether the target record array corresponds to the earliest time range (operation 504). If so, the target record array includes at most one entry (the target entry), and the system updates the target entry's time range to cover a time range corresponding to the record entries being migrated (operation 506). The system can then continue to update the target entry to account for the data indicated by the record entries being migrated (operation 510). For example, when timestamp-indexed record 300 becomes full, the system can migrate the oldest record entries of record array 306 into record array 308. Thus, because record array 308 includes one record entry that covers the oldest timestamp values, the system performs operation 510 by updating the record entry's time range so that it covers the time interval [1, 419]. The system also updates the record entry's data to account for the amount of memory accessed during the time range indicated by the record entries being migrated.

However, if the system determines at operation 504 that the target record array does not correspond to the earliest time range, the system continues to allocate a record entry that has a time range covering the time range for the record entries being migrated (operation 508). The system can then continue to operation 510 to update the allocated record entry's data so that it accounts for the data indicated by the record entries being migrated. For example, to migrate the four oldest entries from record array 302 (with a combined time interval [444, 447]) into record array 304, the system can perform operation 508 by allocating a record entry within available entry 312 so that it covers the time range [444, 447]. In some embodiments, when record array 304 becomes full, the system can perform operation 508 by first migrating a subset of entries from record array 304 into an available entry of record array 306, and releasing the subset of entries from record array 304.

Figure 6A:
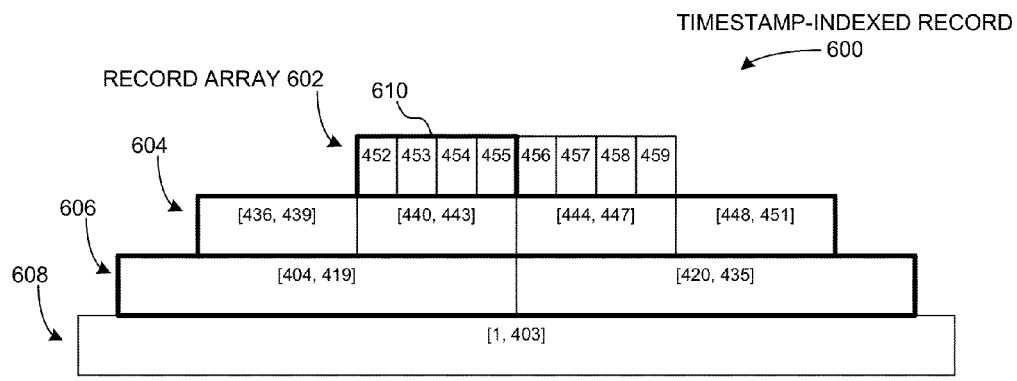
FIG. 6A illustrates a timestamp-indexed record data structure before allocating a new record entry in accordance with an embodiment of the present invention.

FIG. 6A illustrates a timestamp-indexed record 600 before being allocated a new record entry in accordance with an embodiment of the present invention. Data structure 600 includes record arrays 602, 604, 606, and 608 that cover a contiguous time range [1, 459]. Specifically, record arrays 602, 604, 606, and 608 are completely filled and do not include an available entry for allocating a new record entry. Thus, when the system detects a memory access operation at time 460, the system allocates a record entry for this timestamp value by first migrating array subset 610 (e.g., record entries for the time range [452, 455]) to a record entry in array 604. However, because record arrays 604 and 606 are also full, the system needs to first migrate entries in array 606 (e.g., record entries for the time range [404, 435]) to a record entry in array 608, and then migrate entries in array 604 (e.g., record entries for the time range [436, 451]) to a record entry in array 606.

Figure 6B:
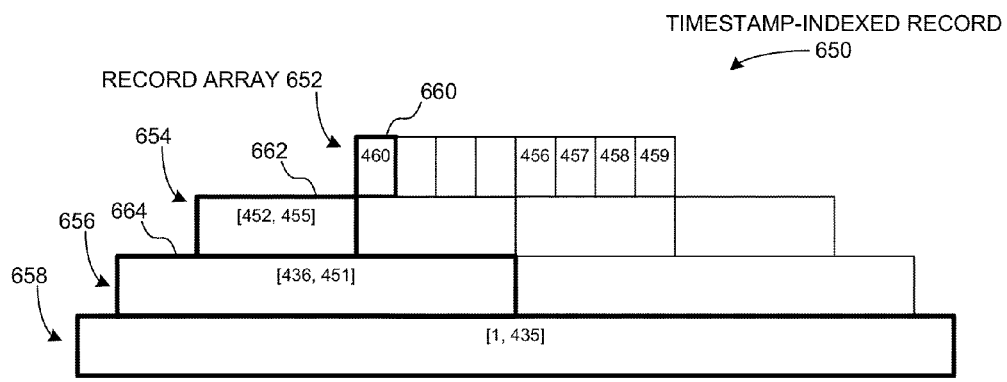
FIG. 6B illustrates a timestamp-indexed record data structure after allocating a new record entry in accordance with an embodiment of the present invention.

FIG. 6B illustrates a timestamp-indexed record 650 after being allocated a new record entry in accordance with an embodiment of the present invention. Record arrays 652, 654, 656, and 658 correspond to arrays 602, 604, 606, and 608 (see FIG. 6A) after the system migrates and releases record entries, and after the system creates a new record entry 660 that corresponds to timestamp value 460. Specifically, record entry 662 has a time range corresponding to that covered by record entries 610 of FIG. 6A, and record entry 662 accounts for the data values stored in record entries 610. Similarly, record entry 664 has a time range corresponding to that covered by array 604 of FIG. 6A, and accounts for the stored data values in array 604. Further, the time range for array 658 has been expanded to account for the record entries in array 606 of FIG. 6A, and the data stored by record array 658 has been updated to account for the data stored in array 606.

Figure 7:
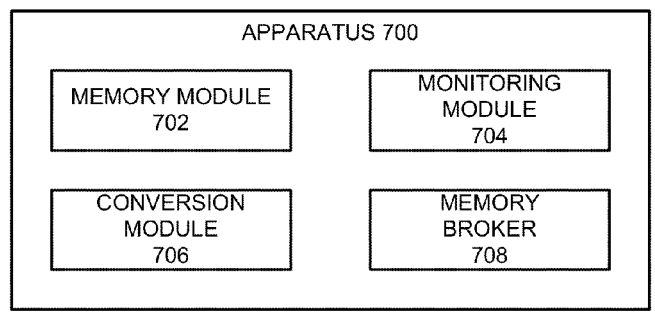
FIG. 7 illustrates an exemplary apparatus that facilitates optimizing a memory allocation for a memory pool in accordance with an embodiment of the present invention.

FIG. 7 illustrates an exemplary apparatus 700 that facilitates optimizing a memory allocation for a memory pool in accordance with an embodiment of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a memory module 702, monitoring module 704, a conversion module 706, and a memory broker 708.

In some embodiments, memory module 702 can include a volatile memory (e.g., random-access memory, or RAM) that serves as a managed memory, and can be used to store one or more memory pools. Monitoring module 704 can monitor memory access operations for memory module 702 and/or a storage device (not shown), and can maintain a timestamp-indexed record based on the memory access operations. Conversion module 706 can use the timestamp-indexed record to generate a time-saved array, which indicates an amount of time that can be saved for a plurality of alternative memory pool sizes. Memory broker 708 can use the time-saved array to optimize the amount of memory allocated to each of the one or more memory pools.

Figure 8:
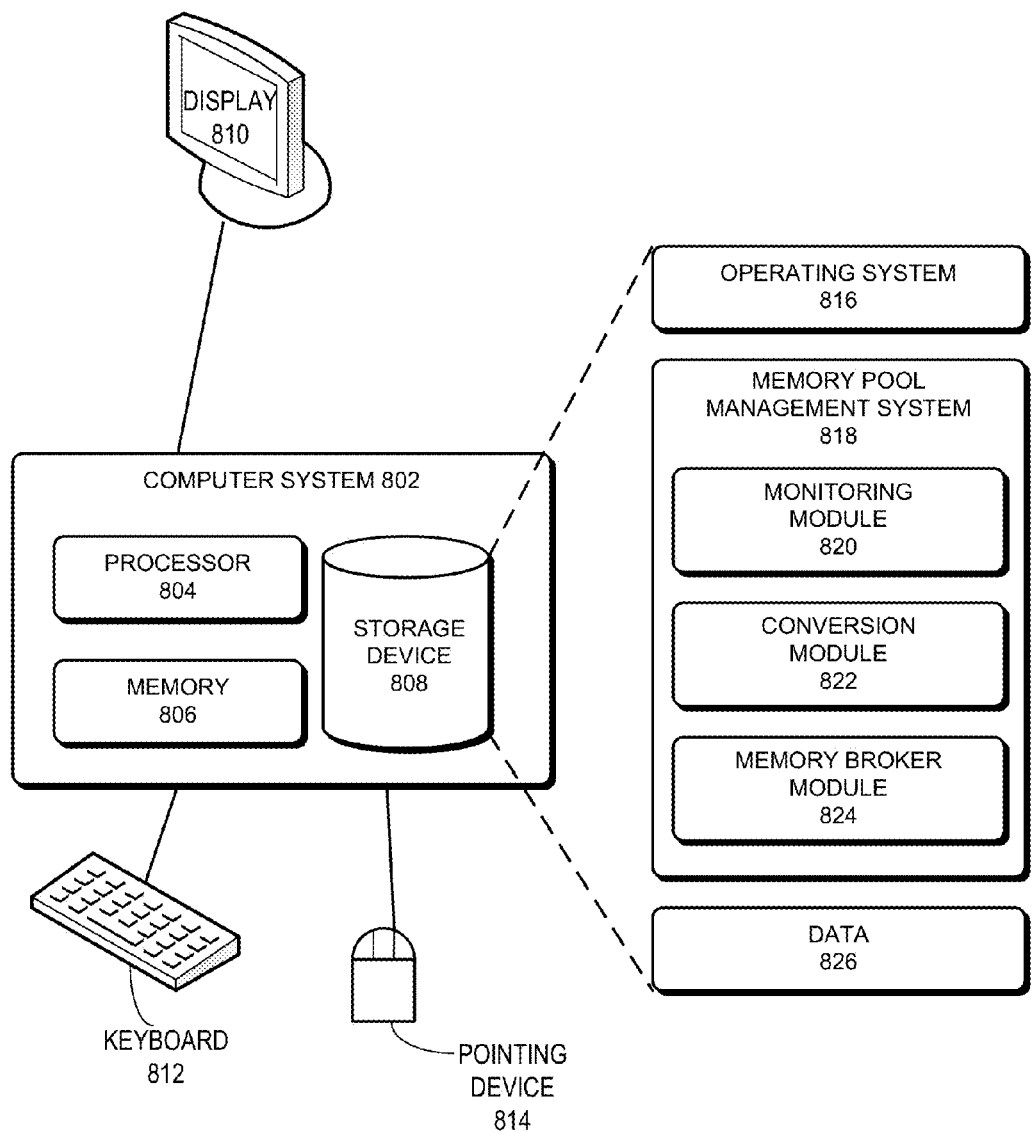
FIG. 8 illustrates an exemplary computer system that facilitates optimizing a memory allocation for a memory pool in accordance with an embodiment of the present invention.

FIG. 8 illustrates an exemplary computer system 802 that facilitates optimizing a memory allocation for a memory pool in accordance with an embodiment of the present invention. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, memory pool management system 818, and data 826.

Memory pool management system 818 can include instructions, which when executed by computer system 802, can cause computer system 802 to perform methods and/or processes described in this disclosure. Specifically, memory pool management system 818 may include instructions for monitoring memory access operations for memory 806 and/or storage device 808, and can maintain a timestamp-indexed record based on the memory access operations (monitoring module 820). Further, memory pool management system 818 may include instructions for generating a time-saved array based on the timestamp-indexed record (conversion module 822). Memory pool management system 818 may also include instructions for optimizing the amount of memory allocated to each of the one or more memory pools based on the time-saved array (memory broker module 824).

Data 826 can include any data that is required as input or that is generated as output by the methods and/or processes described in this disclosure. Specifically, data 826 can store at least a policy for managing one or more memory pools, a timestamp-indexed record and a time-saved array for a memory pool, and memory pool configuration information.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
    detecting, at a computing device, a memory access operation for a block of data;
    determining a timestamp for the memory access operation;
    selecting from a timestamp-indexed record a record entry indexed by the timestamp, wherein the selected record entry indicates a time range associated with the timestamp and further indicates an amount of memory accessed during the indicated time range, and wherein the timestamp-indexed record includes a plurality of record arrays, each of which corresponds to a different time range, and includes one or more record entries of a different array-specific time duration; and
    updating the selected record entry to account for the memory size of the block of data.

2. The method of claim 1, wherein selecting the record entry comprises:
    determining a first record array whose time range corresponds to the timestamp;
    determining that the first record array does not include a record entry for the timestamp; and
    allocating, in the first record array, a record entry for the timestamp.

3. The method of claim 2, wherein allocating the record entry in the first record array comprises:
    determining that the first record array does not have an available record entry;
    migrating a subset of record entries of the first record array to a target record entry of a second record array, wherein the target record entry is associated with a larger time duration than those of the first record array; and
    releasing the subset of record entries of the first record array.

4. The method of claim 3, wherein migrating the subset of record entries of the first record array to the target record entry of the second record array comprises:
    allocating, in the second record array, a record entry that has a time range covering the time range of the subset of record entries; and
    updating the allocated record entry to indicate an amount of data accessed during the time range associated with the subset of record entries.

5. The method of claim 3, wherein the second record array includes at most one record entry associated with an earliest time range of the timestamp-indexed record; and
    wherein migrating the subset of the record entries of the first record array to the target record entry of the second record array comprises:
        updating the target record entry's time range to cover a time range of the subset of record entries; and
        updating the target record entry to account for an amount of data accessed during the time range of the subset of record entries.

6. The method of claim 1, further comprising generating a time-saved array for a memory pool of a managed memory based on the timestamp-indexed record, wherein the time-saved array indicates an amount of time saved during memory access operations for each of a plurality of alternative memory pool sizes.

7. The method of claim 6, further comprising:
    selecting, from a plurality of memory pools of the managed memory, a memory pool that benefits most from an increase in available memory based on a corresponding time-saved array associated with the memory pool; and
    determining an amount by which to increase the selected memory pool's available memory based on the corresponding time-saved array.

8. The method of claim 1, wherein a record entry further indicates at least one or more of:
    an amount of memory used by data objects accessed during the record entry's time range; and
    an amount of memory accessed after the record entry's time range.

9. A non-transitory computer-readable storage medium storing instructions that when executed by a computer cause the computer to perform a method comprising:
    detecting a memory access operation for a block of data;
    determining a timestamp for the memory access operation;
    selecting from a timestamp-indexed record a record entry indexed by the timestamp, wherein the selected record entry indicates a time range associated with the timestamp and further indicates an amount of memory accessed during the indicated time range, and wherein the timestamp-indexed record includes a plurality of record arrays, each of which corresponds to a different time range, and includes one or more record entries of a different array-specific time duration; and
    updating the selected record entry to account for the memory size of the block of data.

10. The storage medium of claim 9, wherein selecting the record entry comprises:
    determining a first record array whose time range corresponds to the timestamp;
    determining that the first record array does not include a record entry for the timestamp; and
    allocating, in the first record array, a record entry for the timestamp.

11. The storage medium of claim 10, wherein allocating the record entry in the first record array comprises:
    determining that the first record array does not have an available record entry;
    migrating a subset of record entries of the first record array to a target record entry of a second record array, wherein the target record entry is associated with a larger time duration than those of the first record array; and
    releasing the subset of record entries of the first record array.

12. The storage medium of claim 11, wherein migrating the subset of record entries of the first record array to the target record entry of the second record array comprises:
- allocating, in the second record array, a record entry that has a time range covering the time range of the subset of record entries; and
- updating the allocated record entry to indicate an amount of data accessed during the time range associated with the subset of record entries.

13. The storage medium of claim 11, wherein the second record array includes at most one record entry associated with an earliest time range of the timestamp-indexed record; and
- wherein migrating the subset of the record entries of the first record array to the target record entry of the second record array comprises:
  - updating the target record entry's time range to cover a time range of the subset of record entries; and
  - updating the target record entry to account for an amount of data accessed during the time range of the subset of record entries.

14. The storage medium of claim 9, wherein the method further comprises generating a time-saved array for a memory pool of a managed memory based on the timestamp-indexed record, wherein the time-saved array indicates an amount of time saved during memory access operations for each of a plurality of alternative memory pool sizes.

15. The storage medium of claim 14, wherein the method further comprises:
- selecting, from a plurality of memory pools of the managed memory, a memory pool that benefits most from an increase in available memory based on a corresponding time-saved array associated with the memory pool; and
- determining an amount by which to increase the selected memory pool's available memory based on the corresponding time-saved array.

16. The method of claim 9, wherein a record entry further indicates at least one or more of:
- an amount of memory used by data objects accessed during the record entry's time range; and
- an amount of memory accessed after the record entry's time range.

17. An apparatus comprising:
- a processor;
- a memory storing instructions that implement a monitoring mechanism, a selection mechanism, and an updating mechanism, wherein
- the monitoring mechanism determines a timestamp for a memory access operation that accesses a block of data;
- the selecting mechanism selects from a timestamp-indexed record a record entry indexed by the timestamp, wherein the selected record entry indicates a time range associated with the timestamp and further indicates an amount of memory accessed during the indicated time range, and wherein the timestamp-indexed record includes a plurality of record arrays, each of which corresponds to a different time range, and includes one or more record entries of a different array-specific time duration; and
- the updating mechanism updates the selected record entry to account for the memory size of the block of data.

18. The apparatus of claim 17, wherein the selecting mechanism is further configured to:
- determine a first record array whose time range corresponds to the timestamp;
- determine that the first record array does not include a record entry for the timestamp; and
- allocate, in the first record array, a record entry for the timestamp.

19. The apparatus of claim 18, wherein while allocating the record entry in the first record array, the selecting mechanism is further configured to:
- determine that the first record array does not have an available record entry;
- migrate a subset of record entries of the first record array to a target record entry of a second record array, wherein the target record entry is associated with a larger time duration than those of the first record array; and
- release the subset of record entries of the first record array.

20. The apparatus of claim 19, wherein while migrating the subset of record entries, the selecting mechanism is further configured to:
- allocate, in the second record array, a record entry that has a time range covering the time range of the subset of record entries; and
- update the allocated record entry to indicate an amount of data accessed during the time range associated with the subset of record entries.

21. The apparatus of claim 19, wherein the second record array includes at most one record entry associated with an earliest time range of the timestamp-indexed record; and
- wherein while migrating the subset of the record entries, the selecting mechanism is further configured to:
  - update the target record entry's time range to cover a time range of the subset of record entries; and
  - update the target record entry to account for an amount of data accessed during the time range of the subset of record entries.

22. The apparatus of claim 17, further comprising a conversion mechanism to generate a time-saved array for a memory pool of a managed memory based on the timestamp-indexed record, wherein the time-saved array indicates an amount of time saved during memory access operations for each of a plurality of alternative memory pool sizes.

23. The apparatus of claim 22, further comprising a memory broker to:
- select, from a plurality of memory pools of the managed memory, a memory pool that benefits most from an increase in available memory based on a corresponding time-saved array associated with the memory pool; and
- determine an amount by which to increase the selected memory pool's available memory based on the corresponding time-saved array.

24. The apparatus of claim 17, wherein a record entry further indicates at least one or more of:
- an amount of memory used by data objects accessed during the record entry's time range; and
- an amount of memory accessed after the record entry's time range.

* * * * *

UNITED STATES PATENT AND TRADEMARK OFFICE
CERTIFICATE OF CORRECTION

PATENT NO. : 8,549,238 B2  Page 1 of 1
APPLICATION NO. : 13/249009
DATED : October 1, 2013
INVENTOR(S) : Habeck It is certified that error appears in the above-identified patent and that said Letters Patent is hereby corrected as shown below:

In the Drawing

On Sheet 3 of 6, in figure 4, under Reference Numeral No. 408, line 5, delete "time-stamp" and insert -- timestamp --, therefor.

Signed and Sealed this
Twenty-fifth Day of February, 2014

Michelle K. Lee
*Deputy Director of the United States Patent and Trademark Office*